United States Patent
Schindler et al.

(10) Patent No.: US 9,854,336 B2
(45) Date of Patent: Dec. 26, 2017

(54) SYSTEMS AND METHODS FOR COUPLING A FIBER TO A POLARIZATION SENSITIVE PHOTONIC INTEGRATED CIRCUIT

(71) Applicant: Infinera Corporation, Annapolis Junction, MD (US)

(72) Inventors: Philipp Claudius Schindler, Santa Clara, CA (US); Jeffrey Rahn, Sunnyvale, CA (US); Rene Schmogrow, Santa Clara, CA (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 14/986,461

(22) Filed: Dec. 31, 2015

(65) Prior Publication Data
US 2017/0195755 A1    Jul. 6, 2017

(51) Int. Cl.
| | | |
|---|---|---|
| *H04B 10/00* | (2013.01) | |
| *H04Q 11/00* | (2006.01) | |
| *H04J 14/06* | (2006.01) | |
| *H04J 14/02* | (2006.01) | |

(52) U.S. Cl.
CPC .......... *H04Q 11/0005* (2013.01); *H04J 14/02* (2013.01); *H04J 14/06* (2013.01); *H04Q 2011/0016* (2013.01); *H04Q 2011/0026* (2013.01); *H04Q 2011/0049* (2013.01)

(58) Field of Classification Search
CPC ....... H04Q 11/0005; H04Q 2011/0049; H04Q 2011/0016; H04Q 2011/0026; H04J 14/06; H04J 14/02
See application file for complete search history.

(56) References Cited

U.S. PATENT DOCUMENTS

| | | | | |
|---|---|---|---|---|
| 8,126,331 | B2* | 2/2012 | Nakajima | H04B 10/07955 398/82 |
| 8,571,084 | B2* | 10/2013 | Docter | H01S 5/06256 372/20 |
| 2005/0111848 | A1* | 5/2005 | Grubb | G02B 6/12007 398/147 |
| 2015/0311669 | A1* | 10/2015 | Chuang | H01S 5/0064 398/65 |
| 2016/0033728 | A1* | 2/2016 | Kish, Jr. | G02B 6/272 385/14 |

* cited by examiner

*Primary Examiner* — Danny Leung
(74) *Attorney, Agent, or Firm* — David L. Soltz (57) ABSTRACT

The integrated network element offers an efficient fiber-chip coupling of multiple outputs of a polarization sensitive photonic integrated circuit (PIC) using a programmable mirror co-packaged with the PIC. Efficient fiber-chip coupling requires precise and active alignment of all free-space components. These constraints can be reduced by using a programmable mirror in the form of a liquid crystal on silicon (LCoS) device. The LCoS can be programmed with patterns that offer highly accurate beam-steering and focusing functionality. Imaging optics may be used at the PIC facet to provide some degree of collimation in the free-space optical path to efficiently illuminate the LCoS. By reprogramming the LCoS switching between two outputs/inputs can be obtained at high speed.

20 Claims, 4 Drawing Sheets

SYSTEMS AND METHODS FOR COUPLING A FIBER TO A POLARIZATION SENSITIVE PHOTONIC INTEGRATED CIRCUIT

FIELD OF DISCLOSURE

This disclosure relates generally to photonic integrated circuits and more specifically, but not exclusively, to coupling optical fibers to a photonic integrated circuit.

BACKGROUND

A photonic integrated circuit (PIC) or integrated optical circuit is a device that integrates multiple (at least two) photonic functions and as such is similar to an electronic integrated circuit. The major difference between the two is that a photonic integrated circuit provides functionality for information signals imposed on optical wavelengths typically in the visible spectrum or near infrared 850 nm-1650 nm. On the PIC, a single polarization is utilized. Any light in the other polarization causes degradation in the performance. Off-chip two of these signals may then be coupled to orthogonal polarization states of the output-fiber. Off-chip optical components are very sensitive to alignment for efficient coupling and meeting the right angle of polarization. An active alignment process is required for high performance. Any reflection from off-chip optical components to the chip further degrades the performance of the PIC.

PICs are well suited to applications in various technologies such as telecommunications. In operation, photonic integrated circuits use optical waveguides to implement network elements or devices, such as optical switches, optical routers, optical couplers and wavelength multiplexers/demultiplexers, for example. Such waveguides, when integrated with a photonic integrated circuit, are typically implemented as solid dielectric light conductors, which are fabricated on a substrate in a very similar fashion as semiconductor integrated circuits are manufactured. Waveguides transmit light around optical circuits and also connect to external optical waveguides, such as optical fibers, typically by direct physical abutment of the fiber with the waveguide. However, in such a configuration, a mode mismatch results between the integrated waveguide and the optical fiber. Specifically, because the difference of the refractive index between the core and cladding of a typical waveguide is higher than that of a typical optical fiber, the optical field is more confined in the waveguide than in the fiber.

Another issue is that the PIC has a preferred polarization state in which its functional blocks operate as intended. However, imperfect fabrication causes transformation of the desired TE mode into the TM mode. Any power in the TM mode will impair the performance of the intended PIC. The ratio of TE and TM is referred to as polarization extinction ratio (PER). Standard polarization combining techniques do not offer a polarization selectivity but introduce additional polarization cross-talk thus further decreasing the PER and with this performance.

Accordingly, there is a need for systems, apparatus, and methods that improve upon conventional approaches including the improved methods, system and apparatus provided hereby.

SUMMARY

The following presents a simplified summary relating to one or more aspects and/or examples associated with the apparatus and methods disclosed herein. As such, the following summary should not be considered an extensive overview relating to all contemplated aspects and/or examples, nor should the following summary be regarded to identify key or critical elements relating to all contemplated aspects and/or examples or to delineate the scope associated with any particular aspect and/or example. Accordingly, the following summary has the sole purpose to present certain concepts relating to one or more aspects and/or examples relating to the apparatus and methods disclosed herein in a simplified form to precede the detailed description presented below.

In one aspect, an apparatus including: a first transmitter configured to transmit a first optical signal at a first wavelength; a second transmitter configured to transmit a second optical signal at a second wavelength; a first multiplexer adjacent to the first transmitter and the second transmitter, the first multiplexer configured to combine the first optical signal and the second optical signal into a first multi-wavelength optical signal with a first plurality of wavelengths; a first mirror located adjacent to the first multiplexer such that the first mirror is in a path of the first multi-wavelength optical signal, the first mirror configured to reflect the first multi-wavelength optical signal based on a first location of impact and each wavelength of the first plurality of wavelengths; an output fiber adjacent to the first transmitter and the second transmitter, the output fiber positioned such that the output fiber is in the path of the reflected first multi-wavelength optical signal; a first receiver configured to receive a third optical signal at a third wavelength; a second receiver configured to receive a fourth optical signal at a fourth wavelength; a first de-multiplexer adjacent to the first receiver and the second receiver, the first de-multiplexer configured to de-multiplex a second multi-wavelength optical signal with a second plurality of wavelengths into the third optical signal and the fourth optical signal; a second mirror located adjacent to the first de-multiplexer such that the second mirror is in a path of the second multi-wavelength optical signal, the second mirror configured to reflect the second multi-wavelength optical signal based on a second location of impact and each wavelength of the second plurality of wavelengths; and an input fiber adjacent to the first receiver and the second receiver, the input fiber positioned such that the input fiber is in the path of the reflected second multi-wavelength optical signal.

In another aspect, an apparatus including: a first transmitter configured to transmit a first optical signal at a first wavelength; a second transmitter configured to transmit a second optical signal at a second wavelength; a first multiplexer adjacent to the first transmitter and the second transmitter, the first multiplexer configured to combine the first optical signal and the second optical signal into a first multi-wavelength optical signal with a first plurality of wavelengths; a first mirror located adjacent to the first multiplexer such that the first mirror is in a path of the first multi-wavelength optical signal, the first mirror configured to reflect the first multi-wavelength optical signal based on a first location of impact and each wavelength of the first plurality of wavelengths; and an output fiber adjacent to the first transmitter and the second transmitter, the output fiber positioned such that the output fiber is in the path of the reflected first multi-wavelength optical signal.

In still another aspect, an apparatus including: a first receiver configured to receive a third optical signal at a third wavelength; a second receiver configured to receive a fourth optical signal at a fourth wavelength; a first de-multiplexer adjacent to the first receiver and the second receiver, the first de-multiplexer configured to de-multiplex a second multi-wavelength optical signal with a second plurality of wavelengths into the third optical signal and the fourth optical signal; a second mirror located adjacent to the first de-multiplexer such that the second mirror is in a path of the second multi-wavelength optical signal, the second mirror configured to reflect the second multi-wavelength optical signal based on a second location of impact and each wavelength of the second plurality of wavelengths; and an input fiber adjacent to the first receiver and the second receiver, the input fiber positioned such that the input fiber is in the path of the reflected second multi-wavelength optical signal.

Other features and advantages associated with the apparatus and methods disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

The exemplary methods, apparatus, and systems disclosed herein advantageously address the industry needs, as well as other previously unidentified needs, and mitigate shortcomings of the conventional methods, apparatus, and systems. For example, an efficient fiber-chip coupling multiple outputs of a polarization sensitive photonic integrated circuit (PIC) may include precise and active alignment of all free-space components using a programmable mirror in the form of a liquid crystal on silicon (LCoS) device. The LCoS can be programmed with patterns that offer highly accurate beam-steering and focusing functionality. Imaging optics (e.g. optic elements) may be used at the PIC facet or an output fiber to provide some degree of collimation in the free-space optical path to efficiently illuminate the LCoS.

Wavelength division multiplexed (WDM) optical communication systems (referred to as "WDM systems") are systems in which multiple optical signals, each having a different wavelength, are combined onto a single optical fiber using an optical multiplexer circuit (referred to as a "multiplexer"). Such systems may include a transmitter circuit, such as a transmitter (Tx) PIC having a transmitter component to provide a laser associated with each wavelength, a modulator configured to modulate the output of the laser, and multiplexer to combine each of the modulated outputs (e.g., to form a combined output).

A PIC is a device that integrates multiple photonic functions on a single integrated device. PICs may be fabricated in a manner similar to electronic integrated circuits but, depending on the type of PIC, may be fabricated using one or more of a variety of types of materials, including silica on silicon, silicon on insulator, and various polymers and semiconductor materials which are used to make semiconductor lasers, such as GaAs, InP and their alloys.

A WDM system may also include a receiver circuit having a receiver (Rx) PIC and an optical demultiplexer circuit (referred to as a "demultiplexer") configured to receive the combined output and demultiplex the combined output into individual optical signals. Additionally, the receiver circuit may include receiver components to convert the optical signals into electrical signals, and output the data carried by those electrical signals.

The transmitter (Tx) and receiver (Rx) PICs, in an optical communication system, may support communications over a number of wavelength channels. For example, a pair of Tx/Rx PICs may support ten channels, each spaced by, for example, 50 GHz. The set of channels supported by the Tx and Rx PICs can be referred to as the channel "grid" for the PICs. Channel grids for Tx/Rx PICs may be aligned to standardized frequencies, such as those published by the Telecommunication Standardization Sector (ITU-T). The set of channels supported by the Tx and Rx PICs may be referred to as the ITU frequency grid for the Tx/Rx PICs.

In WDM systems, the demultiplexer may be capable of receiving first and second optical signals associated with the combined output in order to increase data rates associated with the WDM system. In order to further increase the data rates associated with a WDM system, additional WDM components are sometimes incorporated. For example, some WDM systems may include a polarization beam splitter (PBS) to receive the combined output and output first and second optical signals, to increase the data rates associated with the WDM system. The first optical signal may include components having a first polarization and the second optical signal may include components having a second polarization. Some WDM systems may further include a rotator to rotate the polarization of the components associated with the first optical signal such that the components have the second polarization, thereby allowing the demultiplexer to process optical signals associated with one polarization (e.g., the second polarization).

WDM systems are sometimes constructed from discrete components (e.g., a transmitter component, a multiplexer, a demultiplexer, a PBS, a rotator, and/or a receiver component). For example, demultiplexers and receiver components may be packaged separately and provided on a printed circuit board. Alternatively, WDM components are sometimes integrated onto a single chip, also referred to as a photonic integrated circuit (PIC). For example, a PBS and a rotator are provided on the same PIC as a demultiplexer.

Implementations described herein may provide a WDM system with a programmable mirror co-packaged with a PIC. In the first examples, the WDM system includes a rotator provided external to a transmitter or receiver circuit (e.g., a transmitter PIC or receiver PIC) associated with the WDM system. In some implementations, providing the rotator separate from the transmitter PIC or the receiver PIC may allow the rotator to receive multiple sets of components associated with multiple optical signals, and to rotate a polarization associated with each one of the multiple sets of components (e.g., components supplied by multiple PBSs or some other source) to form rotated components. As a result, a single rotator may supply multiple sets of rotated components to one or more optical devices (e.g., optical multiplexers, optical demultiplexers, and/or optical receivers) associated with the WDM system. However, it should be understood that the rotator details are merely provided to make the disclosure more complete and may be internal or co-packaged with the PIC.

For example, assume that a WDM system includes a PBS that receives an input optical signal (e.g., a modulated output from an optical multiplexer, and/or some other source), and supplies output optical signals having components (e.g., via a first output and/or a second output). The components may be associated with different polarizations (e.g., the components outputted by the PBS may be associated with a first polarization, such as a Transverse Magnetic (TM) polarization, while the components outputted by the PBS may be associated with a second polarization, such as a Transverse Electric (TE) polarization).

In some implementations, the WDM system may include a rotator to rotate the polarization associated with the components to form rotated components, such that the rotated components have the second polarization. The rotator may supply the rotated components to an optical demultiplexer and the PBS may supply the components to the optical demultiplexer. As a result, the optical demultiplexer receives components having the same polarization (e.g., the second polarization). In some implementations, the construction of the optical demultiplexer may be simplified when the optical demultiplexer receives components having the same polarization. Additionally, the optical demultiplexer may output signals with components having one polarization based on receiving components with one polarization. In some implementations, it may be desirable to output signals having the same polarization in order to match the polarization of a local oscillator, associated with the WDM system, thereby improving the performance of the local oscillator.

While implementations may be described in terms of the TM polarization as the first polarization and the TE polarization as the second polarization, it will be apparent that the first polarization may be the TE polarization and the second polarization may be the TM polarization.

In some implementations, the rotator may rotate the polarization associated with multiple sets of components. For example, some implementations may include multiple PBSs, such that each PBS supplies a first set of components and a second set of components. Providing the rotator separate from the receiver PIC, for example, may allow a single rotator to rotate the polarization associated with multiple sets of components supplied by multiple PBSs. As a result, a single rotator may supply multiple sets of rotated components to one or more optical demultiplexers.

While the implementations described herein may be described as providing rotated components to an optical demultiplexer associated with a receiver circuit, in practice, some implementations may provide rotated components to an optical multiplexer associated with a transmitter circuit in addition to, or instead of, providing rotated components to an optical demultiplexer associated with a receiver circuit.

Figure 1A:
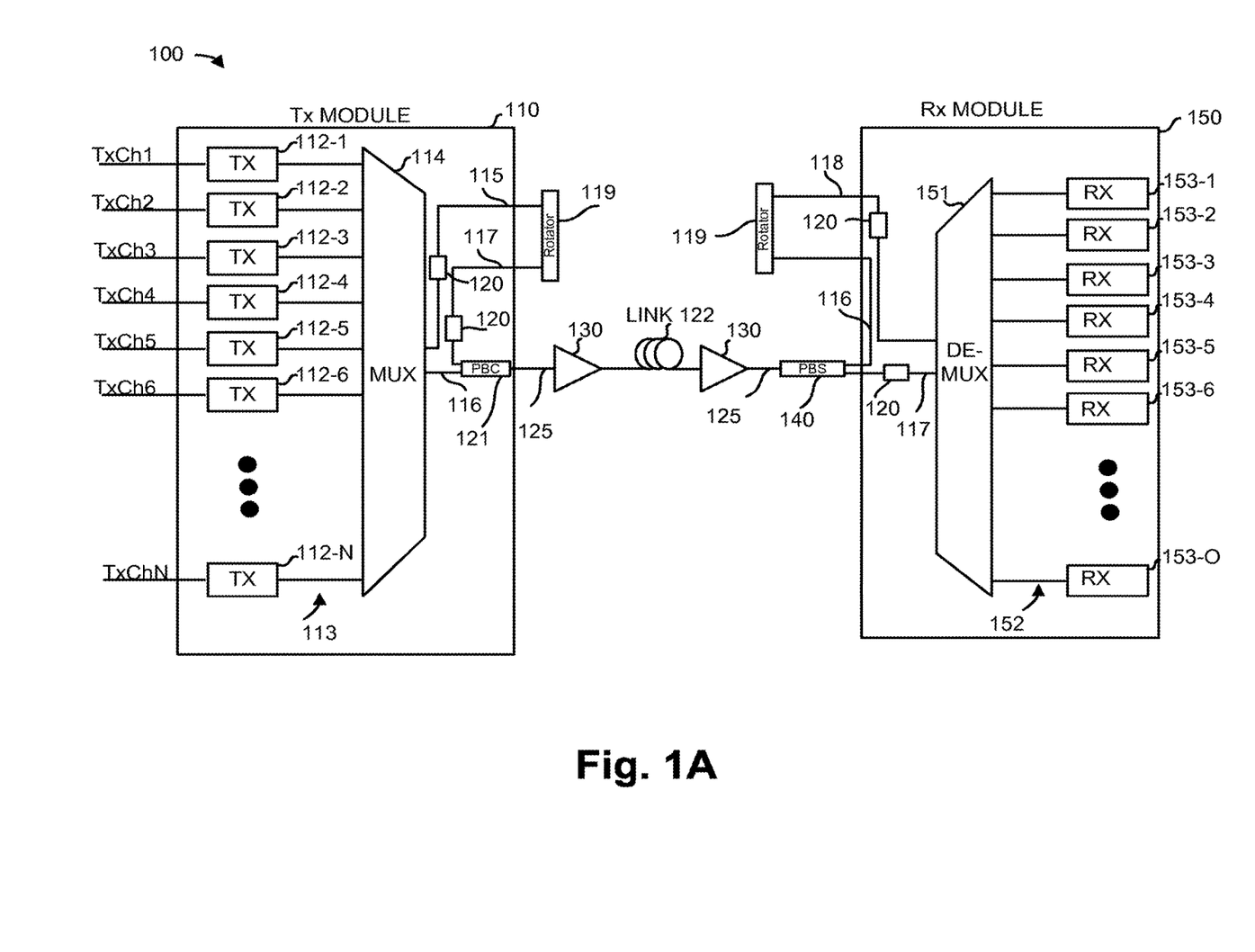
FIGS. 1A and 1B illustrate an exemplary PIC of a network element in accordance with some examples of the disclosure.
Figure 1B:
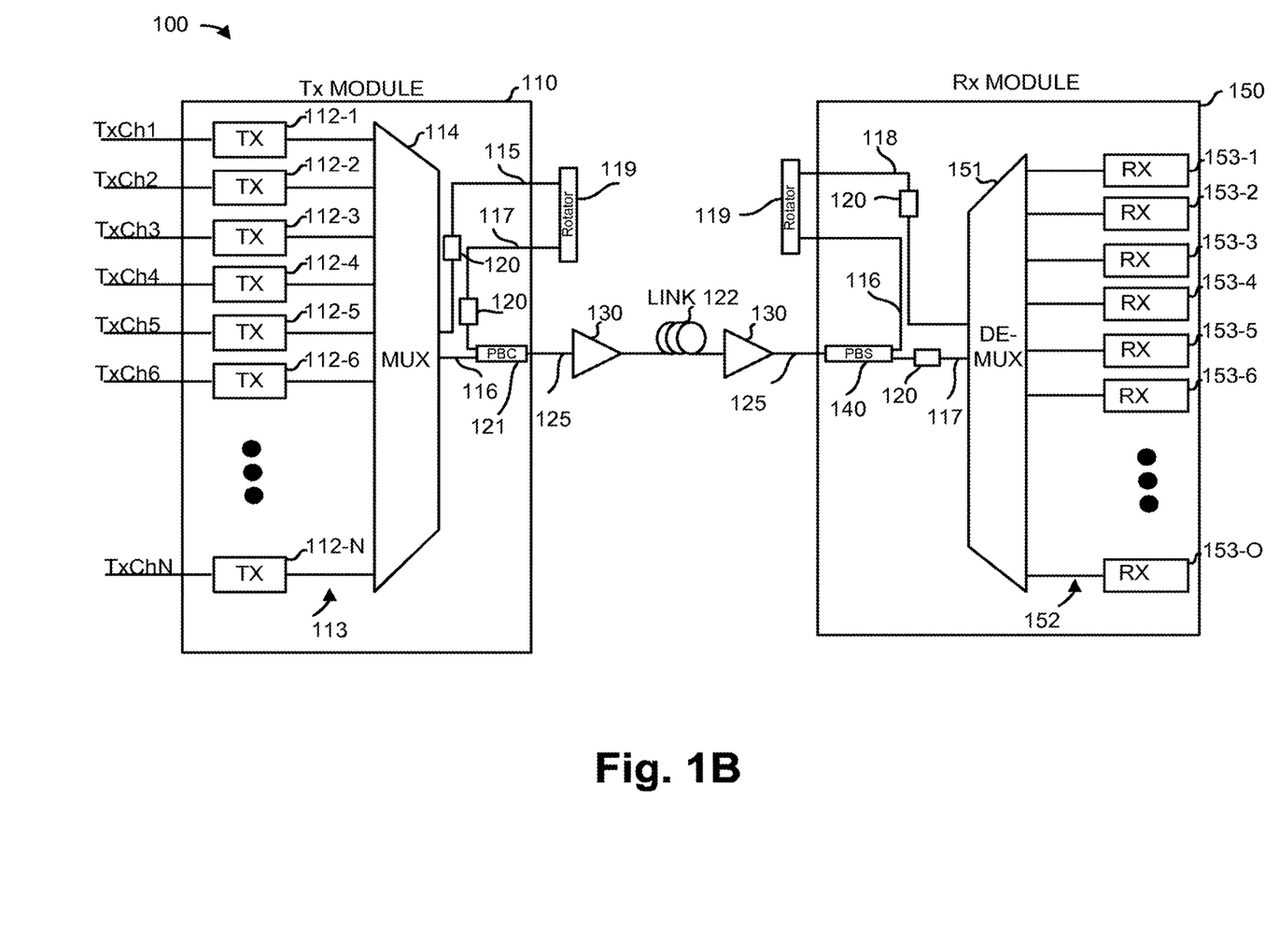

FIGS. 1A and 1B illustrate an exemplary PIC of a network element 100 in accordance with some examples of the disclosure. It should be understood that network element 100 may include additional, fewer, or differently arranged components than shown in FIGS. 1A-1B. As illustrated in FIG. 1A, network element 100 may include transmitter (Tx) module 110 (e.g., a Tx PIC), rotators 119, polarizers 120, polarization beam combiner (PBC) 121, PBS 140, and/or receiver (Rx) module 150 (e.g., an Rx PIC). In some implementations, transmitter module 110 may be optically connected to receiver module 150 via link 122, optical amplifiers 130, and/or PBS 140. Link 122 may include one or more optical amplifiers 130 that amplify an optical signal as the optical signal is transmitted over link 122.

Transmitter module 110 may include a number of optical transmitters 112-1 through 112-N (where N≥1), waveguides 113, optical multiplexer 114, polarizers 120, and/or polarization beam combiner (PBC) 121. Each optical transmitter 112 may receive a data channel (TxCh1 through TxChN), modulate the data channel with an optical signal, and transmit the data channel as an optical signal. In one implementation, transmitter module 110 may include 5, 10, 20, 50, 100, or some other number of optical transmitters 112. Each optical transmitter 112 may be tuned to use an optical carrier of a designated wavelength. It may be desirable that the grid of wavelengths emitted by optical transmitters 112 conform to a known standard, such as a standard published by the Telecommunication Standardization Sector (ITU-T).

In some implementations, each of optical transmitters 112 may include a laser, a modulator, a semiconductor optical amplifier (SOA), and/or some other components. The laser, modulator, and/or SOA may be coupled with a tuning element that can be used to tune the wavelength of the optical signal channel by the laser, modulator, or SOA. In some implementations, a single laser may be shared by multiple optical transmitters 112.

Waveguides 113 may include an optical link or some other link to transmit modulated outputs (referred to as "signal channels") of optical transmitters 112. In some implementations, each optical transmitter 112 may connect to one waveguide 113 or to multiple waveguides 113 to transmit signal channels of optical transmitters 112 to optical multiplexer 114.

Optical multiplexer 114 may include an arrayed waveguide grating (AWG) or some other multiplexing device. In some implementations, optical multiplexer 114 may combine multiple signal channels, associated with optical transmitters 112, into wave division multiplexed (WDM) signals, such as optical signals 115 and 116. In some implementations, optical multiplexer 114 may include an input, (e.g., a first slab to receive signal channels) and an output (e.g., a second slab to supply WDM signals, such as optical signals 115 and 116, associated with input signal channels). Optical multiplexer 114 may also include waveguides connecting the input and the output. In some implementations, the first slab and the second slab may each act as an input and an output. For example, the first slab and the second slab may each receive multiple signal channels. The first slab may supply a single WDM signal corresponding to the signal channels received by the second slab. The second slab may supply a single optical signal (e.g., a WDM signal) corresponding to the signal channels received by the first slab. As shown in FIG. 1A, optical multiplexer 114 may receive signal channels outputted by optical transmitters 112, and output optical signals 115 and 116. Optical signals 115 and 116 may each include one or more optical signals, such that each optical signal includes one or more wavelengths.

Rotator 119 may include an optical device or a collection of optical devices. In some implementations, rotator 119 may receive an optical signal with components having a first polarization (e.g., a TM polarization), rotate the polarization of the components, associated with the optical signal, and supply an optical signal with rotated components having a second polarization (e.g., a TE polarization). In some implementations, rotator 119 may be associated with transmitter module 110. Rotator 119 may receive components associated with optical signal 115 having a first polarization (e.g., a TM polarization), and supply optical signal 117 with rotated components having a second polarization (e.g., a TE polarization). As shown in FIG. 1A, rotator 119 may supply optical signal 117 to PBC 121.

Additionally, or alternatively, rotator 119 may be associated with receiver module 150 and may receive components associated with optical signal 116 having a first polarization (e.g., a TM polarization), and supply optical signal 118 with rotated components having a second polarization (e.g., a TE polarization). As shown in FIG. 1A, rotator 119 may supply optical signal 118 to optical demultiplexer 151.

As described above, rotator 119 may be capable of receiving multiple sets of components associated with multiple optical signals and supplying multiple sets of rotated components associated with the received components. As shown in FIG. 1A, rotator 119 may be located separate and/or detached from receiver module 150. Similarly, 119 may be located separate and/or detached from transmitter module 110.

Polarizer 120 may include an optical device, or a collection of optical devices. In some implementations, polarizer 120 may receive an optical signal, and may absorb components of the optical signal having a particular polarization such as a first polarization (e.g., a TM polarization) or a second polarization (e.g., a TE polarization). In some implementations, polarizers 120 may be associated with transmit module 110 and may receive optical signal 115 supplied by optical multiplexer 114 and/or optical signal 117 supplied by rotator 119.

In some implementations, polarizers 120 may absorb residual components of optical signal 117 having the first polarization. For example, as described above rotator 119 may rotate components associated with optical signal 115 having the first polarization, to supply optical signal 117 with components having the second polarization. Optical signal 117 may include residual components associated with the first polarization. Polarizer 120 may be connected along a path associated with optical signal 117 to absorb the residual components associated with the first polarization, thereby absorbing components having an undesirable polarization. Similarly, polarizer 120 may be connected along a path associated with optical signal 115 to absorb components having an undesirable polarization.

Additionally, or alternatively, polarizers 120 may be associated with receiver module 150 and may receive optical signal 117 supplied by PBS 140 and/or optical signal 118 supplied by rotator 119. In a similar manner as described above, polarizers 120 may absorb components of optical signal 118 having the first polarization (e.g., residual components of optical signal 118 having the first polarization when rotator 119 supplies optical signal 118). Similarly, polarizer 120 may be connected along a path associated with optical signal 117 to absorb components having an undesirable polarization.

PBC 121 may include an optical device, or a collection of optical devices. In some implementations, PBC 121 may receive multiple optical signals and supply a combined optical signal (e.g., a WDM signal, or some other type of optical signal). For example, as shown in FIG. 1A, PBC 121 may receive optical signal 116 and optical signal 117. PBC 121 may supply optical signal 125 based on receiving optical signals 116 and 117. In some implementations, optical signal 125 may include a combined WDM signal associated with optical signals 116 and/or 117.

PBS 140 may include an optical device or a collection of optical devices. In some implementations, PBS 140 may receive an input optical signal (e.g., optical signal 125 or some other signal), and supply output components associated with the input optical signal (e.g., via a first output and/or a second output of PBS 140). As shown in FIG. 1A, PBS 140 may receive optical signal 125 supplied by PBC 121 (e.g., via link 122). PBS 140 may supply components, associated with optical signal 125, (e.g., via a first output and a second output), such as components associated with optical signal 116 (referred to as "first components 116"), and/or components associated with optical signal 117 (referred to as "second components 117"). In some implementations, PBS 140 may supply first components 116 to rotator 119, and supply second components 117 to optical demultiplexer 151. First components 116 may be associated with a first polarization (e.g., a TM polarization) while second components 117 may be associated with a second polarization (e.g., a TE polarization).

As further shown in FIG. 1A, receiver module 150 may include polarizers 120, optical demultiplexer 151, waveguides 152, and/or optical receivers 153-1 through 153-O (where O≥1). In some implementations, optical demultiplexer 151 may include an AWG or some other device. Optical demultiplexer 151 may supply multiple signal channels based on receiving a WDM signal (e.g., optical signal 125), or components associated with the WDM signal. For example, optical demultiplexer 151 may include an input (e.g., a first slab region to receive second components 117, optical signal 118 (referred to as "rotated components 118"), and/or some other input component), and an output (e.g., a second slab region to supply multiple signal channels associated with the input). Optical demultiplexer 151 may include waveguides connecting the input and the output. In some implementations, the first slab and the second slab may each act as an input and an output. For example, the first slab and the second slab may each receive components associated with a WDM signal. The first slab may supply signal channels corresponding to the components received by the second slab. The second slab my supply signal channels corresponding to the components received by the first slab. As shown in FIG. 1A, optical demultiplexer 151 may supply signal channels to optical receivers 152 via waveguides 152.

Waveguides 152 may include optical links or some other links to transmit outputs of optical demultiplexer 151 to optical receivers 153. In some implementations, each optical receiver 153 may receive outputs via a single waveguide 152 or via multiple waveguides 152.

Optical receivers 153 may each operate to convert the input optical signal to an electrical signal that represents the transmitted data. In some implementations, optical receivers 153 may each include one or more photodetectors and/or related devices to receive respective input optical signals outputted by optical demultiplexer 151 and a local oscillator, convert the signals to a photocurrent, and provide a voltage output to function as an electrical signal representation of the original input signal.

In some implementations, and as shown in FIG. 1B, PBS 140 may be located on receiver module 150. As a result, transmitter module 110 may supply optical signal 125 to receiver module 150, via link 122 and/or amplifiers 130. PBS 140 may receive optical signal 125, and may supply first components 116, to rotator 119, along a first path on receiver module 150, and second components 117, to optical demultiplexer 151, along a second path on receiver module 150.

Efficient fiber-chip coupling requires precise and active alignment of all free-space components. These constraints can be reduced by using a programmable mirror in the form of a liquid crystal on silicon (LCoS) device. The LCoS can be programmed with patterns that offer highly accurate beam-steering and focusing functionality. Imaging optics may be used at the PIC facet to provide some degree of collimation in the free-space optical path to efficiently illuminate the LCoS.

Figure 2:
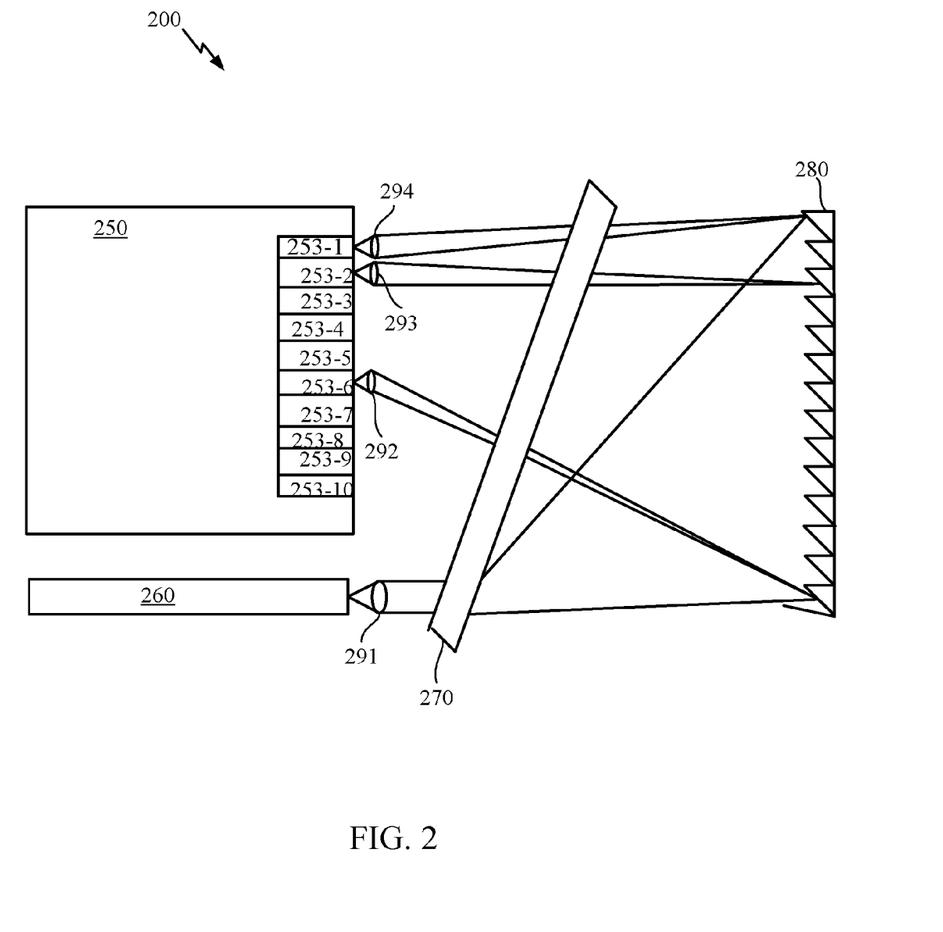
FIG. 2 illustrates an exemplary PIC coupled to a fiber in accordance with some examples of the disclosure.

FIG. 2 illustrates an exemplary PIC coupled to a fiber in accordance with some examples of the disclosure. While FIG. 2 shows an output fiber and a RxPIC, it should be understood that the RxPIC may be a TxPIC and the output fiber may be an input fiber with the optical signal flow reversed. As shown in FIG. 2, a network element 200 may include a RxPIC 250 (e.g. RxPIC 150) with ten receivers 253-1 through 253-10 configured to receive individual wavelength optical signals, an output fiber 260 configured to output a multi-wavelength optical signal with multiple wavelengths, a multiplexer/demultiplexer element 270 (e.g. an arrayed waveguide grating, grating, and/or prism), a programmable mirror 280 (e.g. an LCoS device), a first optic element 291, a second optic element 292, a third optic element 293, and a fourth optic element 294. The output fiber 260 outputs a multi-wavelength optical signal from an end face of the fiber. The multi-wavelength optical signal may be from a transmission line of an optical communication network, for example. The multi-wavelength optical signal exits the end face of the output fiber 260 and travels to the first optic element 291. The first optic element 291 collimates the multi-wavelength optical signal as multi-wavelength optical signal pass through the first optic element 291.

The collimated multi-wavelength optical signal then travels to the multiplexer/demultiplexer element 270. In this direction, the multiplexer/demultiplexer element 270 de-multiplexes the collimated multi-wavelength optical signal into a plurality of individual single wavelength optical signals and aims each of the plurality of individual single wavelength optical signals at a particular location on the programmable mirror 280. For example, if the multiplexer/demultiplexer element 270 is an AWG, the incoming collimated multi-wavelength optical signal traverses a free space and enters a bundle of optical fibers or channel waveguides. The fibers/waveguides have different lengths and thus apply a different phase shift at the exit of the fibers/waveguides. The light then traverses another free space and interferes at the entries of the output fibers/waveguides in such a way that each output channel receives only light of a certain wavelength. The diffracted light exits the element 270 at specific angles configured to aim each of the plurality of individual single wavelength optical signals at a specific location on the programmable mirror 280. As each of the plurality of individual single wavelength optical signals or channels reaches the intended location on the programmable mirror 280, the programmable mirror 280 has a configuration that includes a tailor face that controls the reflection angle of each of the plurality of individual single wavelength optical signals dependent on the respective wavelength of the signal. The reflection angle is unique for each location and dependent on the wavelength of the incoming optical signal. Unwanted wavelengths may be angled into an absorption region of the network element 200 to avoid interference with the wavelengths of interest. Once the plurality of individual single wavelength optical signals are reflected from the programmable mirror 280, each of the plurality of individual single wavelength optical signals follow a separate return path through the multiplexer/demultiplexer element 270 to an associated receiver 253-*x* configured to detect the specific wavelength of the individual single wavelength optical signals.

While four optic elements are illustrated, it should be understood that there may be more or less, for example such that each receiver 253-*x* has an associated optic element located between the receiver and the multiplexer/demultiplexer element 270 or in a TxPIC, the transmitters 112-*x* may be configured (tailor the output angle) such that an optic element or lens is not necessary. The multiplexer/demultiplexer element 270 may be configured to demultiplex (or multiplex in the case of an TxPIC) the multi-wavelength optical signal from the output fiber before the optical signal reaches the programmable mirror. The multiplexer/demultiplexer element 270 de-multiplexes the multi-wavelength optical signal into channels of several wavelengths to retrieve individual channels of different wavelengths at the RxPIC 250 such that each receiver 253-*x* may receive a specific wavelength or channel.

In addition to the functionality described above, the programmable mirror 280 may be pre-programmed with different sets of patterns that allow the programmable mirror 280 to quickly switch the aim of the individual reflected signals to different receivers 253-*x* (or different transmitters in the case of a TxPIC), such as within 50 ms or to receive or transmit an optical signal from a different output/input fiber than fiber 260. The later may require another fiber similar to fiber 260 to be aimed at the multiplexer/demultiplexer element 270, which may be located next to fiber 260 for example. This is beneficial for rapid protection switching in the event of a channel change or a fault in the network and is may be rapid enough such that the electrical components and signals within RxPIC do not register the switch. In one example, pre-programmed patterns can be stored in the network element 200 and can switch quickly between two states, ideally within 50 ms. This will allow switching the receiver to the other input-fiber before electrical switching elements detect a loss of signal. This is particularly useful in case of fiber-cuts or any disturbances in the network. Having two input/output fibers also provides the possibility to address two networks at the same time with different wavelengths provided by the PIC without requiring additional hardware. This is particularly useful for metro networks that use two sets of fibers going in opposite directions.

Also, to ease alignment tolerances a common subcarrier can be used in the LCoS and PIC co-packaging. This subcarrier may be fabricated on silicon-on-insulator or glass substrates and can incorporate optical elements. These optical elements can include spot-size converters providing the functionality for imaging optics, or a dispersive element in the form of an AWG. This AWG can also be integrated into the PIC itself. The addition of a dispersive medium in the path offers wavelength selective beam-steering and power control to offer a highly efficient multiplexing structure that provides programmable filtering similar to a wavelength selective switches (WSS).

The downside of conventional WSS is their high polarization sensitivity that forces the use of complex imaging optics to cope with polarization diverse inputs and outputs. In the examples below this polarization sensitivity acts as another benefit as it is aligned to the main polarization of the PIC and improving the PER of the combined structure. Moreover, the LCoS can provide compensation of misalignment. As an alternative to the aforementioned approaches, the dispersive medium may also be realized in free-space optics as a grating, prism or the combination of both.

Figure 3:
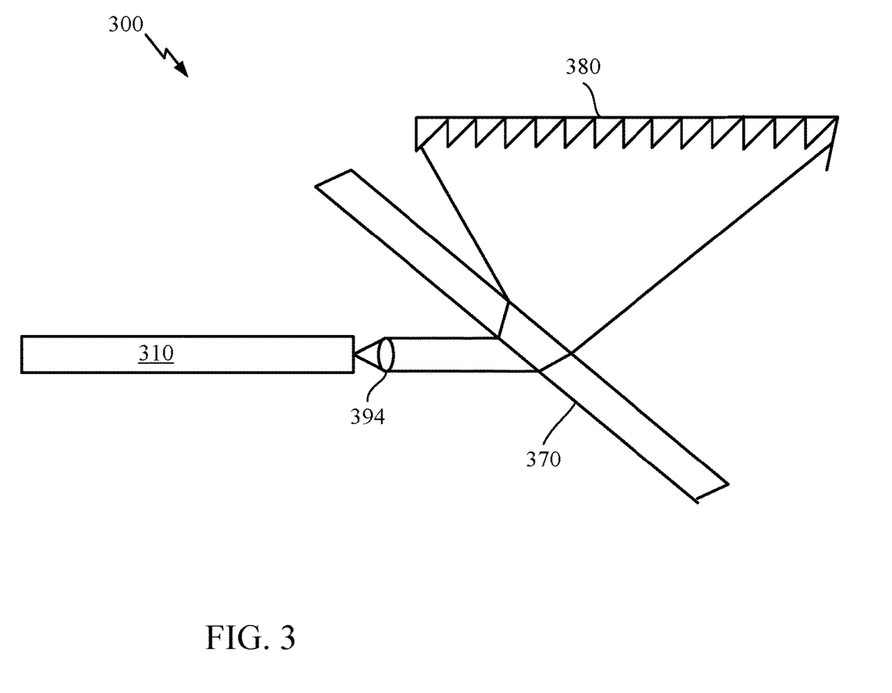
FIG. 3 illustrates a side view of an exemplary PIC in accordance with some examples of the disclosure.

FIG. 3 illustrates a side view of an exemplary TxPIC in accordance with some examples of the disclosure. As shown in FIG. 3, a network element 300 (e.g. network element 100 and network element 200) may include a TxPIC 310 (e.g. TxPIC 110) an optic element 394 (e.g. optic element 294), a multiplexer/demultiplexer element 370 (e.g. an arrayed waveguide grating, grating, and/or prism), a programmable mirror 380 (e.g. an LCoS device) located above the TxPIC 310 on the top of the network element 300. A plurality of single wavelength optical signals may exit transmitters (e.g. transmitters 112-x) towards an optic element 394. The optic element 394 may be optional if the transmitters are configured to adequately focus each of the plurality of single wavelength optical signals towards the multiplexer/demultiplexer element 370. Once the plurality of single wavelength optical signals reach the element 370, the plurality of single wavelength optical signals are multiplexed into a multi-wavelength optical signal that is aimed upward at the programmable mirror 380. Alternatively, a waveguide grating may be applied to the end face of each transmitter in the TxPIC 310 to perform at least some of the functions of element 370.

Examples of devices that may use the PIC described herein may include routers or switches, such as Infinera's DTN-X platform, that may have multiple functionalities like L0 wavelength division multiplexing (WDM) transport capabilities, L1 digital OTN switching capabilities, and L2 packet switching capabilities. The network 100 may be optimized by enabling the packet switching feature in network devices using protocols such as MPLS-TP and switching LSP's, and packet switching in the network core can be performed by the devices.

The word "exemplary" is used herein to mean "serving as an example, instance, or illustration." Any details described herein as "exemplary" is not necessarily to be construed as preferred or advantageous over other examples. Likewise, the term "examples" does not require that all examples include the discussed feature, advantage or mode of operation. Use of the terms "in one example," "an example," "in one feature," and/or "a feature" in this specification does not necessarily refer to the same feature and/or example. Furthermore, a particular feature and/or structure can be combined with one or more other features and/or structures. Moreover, at least a portion of the apparatus described hereby can be configured to perform at least a portion of a method described hereby.

The terminology used herein is for the purpose of describing particular examples only and is not intended to be limiting of examples of the disclosure. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should be noted that the terms "connected," "coupled," or any variant thereof, mean any connection or coupling, either direct or indirect, between elements, and can encompass a presence of an intermediate element between two elements that are "connected" or "coupled" together via the intermediate element.

Any reference herein to an element using a designation such as "first," "second," and so forth does not limit the quantity and/or order of those elements. Rather, these designations are used as a convenient method of distinguishing between two or more elements and/or instances of an element. Thus, a reference to first and second elements does not mean that only two elements can be employed, or that the first element must necessarily precede the second element. Also, unless stated otherwise, a set of elements can comprise one or more elements.

Further, many examples are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the examples described herein, the corresponding form of any such examples may be described herein as, for example, "logic configured to" perform the described action.

Nothing stated or illustrated depicted in this application is intended to dedicate any component, step, feature, benefit, advantage, or equivalent to the public, regardless of whether the component, step, feature, benefit, advantage, or the equivalent is recited in the claims.

Further, those of skill in the art will appreciate that the various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

Although some aspects have been described in connection with a device, it goes without saying that these aspects also constitute a description of the corresponding method, and so a block or a component of a device should also be understood as a corresponding method step or as a feature of a method step. Analogously thereto, aspects described in connection with or as a method step also constitute a description of a corresponding block or detail or feature of a corresponding device. Some or all of the method steps can be performed by a hardware apparatus (or using a hardware apparatus), such as, for example, a microprocessor, a programmable computer or an electronic circuit. In some examples, some or a plurality of the most important method steps can be performed by such an apparatus.

In the detailed description above it can be seen that different features are grouped together in examples. This manner of disclosure should not be understood as an intention that the claimed examples require more features than are explicitly mentioned in the respective claim. Rather, the situation is such that inventive content may reside in fewer than all features of an individual example disclosed. Therefore, the following claims should hereby be deemed to be incorporated in the description, wherein each claim by itself can stand as a separate example. Although each claim by itself can stand as a separate example, it should be noted that—although a dependent claim can refer in the claims to a specific combination with one or a plurality of claims— other examples can also encompass or include a combination of said dependent claim with the subject matter of any other dependent claim or a combination of any feature with other dependent and independent claims. Such combinations are proposed herein, unless it is explicitly expressed that a specific combination is not intended. Furthermore, it is also intended that features of a claim can be included in any other independent claim, even if said claim is not directly dependent on the independent claim.

It should furthermore be noted that methods disclosed in the description or in the claims can be implemented by a device comprising means for performing the respective steps or actions of this method.

Furthermore, in some examples, an individual step/action can be subdivided into a plurality of sub-steps or contain a plurality of sub-steps. Such sub-steps can be contained in the disclosure of the individual step and be part of the disclosure of the individual step.

While the foregoing disclosure shows illustrative examples of the disclosure, it should be noted that various changes and modifications could be made herein without departing from the scope of the disclosure as defined by the appended claims. The functions, steps and/or actions of the method claims in accordance with the examples of the disclosure described herein need not be performed in any particular order. Additionally, well-known elements will not be described in detail or may be omitted so as to not obscure the relevant details of the aspects and examples disclosed herein. Furthermore, although elements of the disclosure may be described or claimed in the singular, the plural is contemplated unless limitation to the singular is explicitly stated.

What is claimed is:

1. An apparatus comprising:
   a first transmitter configured to transmit a first optical signal at a first wavelength;
   a second transmitter configured to transmit a second optical signal at a second wavelength;
   a first multiplexer adjacent to the first transmitter and the second transmitter, the first multiplexer configured to combine the first optical signal and the second optical signal into a first multi-wavelength optical signal with a first plurality of wavelengths;
   a first mirror located adjacent to the first multiplexer such that the first mirror is in a path of the first multi-wavelength optical signal, the first mirror configured to reflect the first multi-wavelength optical signal based a wavelength of each of the first plurality of wavelengths;
   an output fiber adjacent to the first transmitter and the second transmitter, the output fiber positioned such that the output fiber is in the path of the reflected first multi-wavelength optical signal;
   a first receiver configured to receive a third optical signal at a third wavelength;
   a second receiver configured to receive a fourth optical signal at a fourth wavelength;
   a first de-multiplexer adjacent to the first receiver and the second receiver, the first de-multiplexer configured to de-multiplex a second multi-wavelength optical signal with a second plurality of wavelengths into the third optical signal and the fourth optical signal;
   a second mirror located adjacent to the first de-multiplexer such that the second mirror is in a path of the second multi-wavelength optical signal, the second mirror configured to reflect the second multi-wavelength optical signal based on a wavelength of each of the second plurality of wavelengths; and
   an input fiber adjacent to the first receiver and the second receiver, the input fiber positioned such that the input fiber is in the path of the reflected second multi-wavelength optical signal.

2. The apparatus of claim 1, further comprising:
   a second output fiber adjacent to the first transmitter and the second transmitter; and wherein the first mirror is selectively programmed to reflect the first multi-wavelength optical signal towards the second output fiber.

3. The apparatus of claim 1, further comprising:
   a first optic element located between the first transmitter and the first mirror, the first optic element configured to focus the first optical signal at the first multiplexer; and
   a second optic element located between the second transmitter and the first mirror, the second optic element configured to focus the second optical signal at the first multiplexer.

4. The apparatus of claim 3, wherein in the first optic element and the second optic element are lens and the first mirror and the second mirror are the same mirror.

5. The apparatus of claim 1, wherein the first wavelength and the second wavelength are different and the input fiber and the output fiber are the same fiber.

6. The apparatus of claim 1, wherein the first mirror and the second mirror are composed of liquid crystal on silicon.

7. The apparatus of claim 1, wherein the first mirror and the second mirror are a single element.

8. The apparatus of claim 1, wherein the first mirror and the second mirror are located vertically above the first transmitter and the first receiver respectively.

9. The apparatus of claim 1, wherein the first mirror and the second mirror are programmable and configured to passively align the first transmitter and the second transmitter with the first receiver and the second receiver.

10. An apparatus comprising:
a first transmitter configured to transmit a first optical signal at a first wavelength;
a second transmitter configured to transmit a second optical signal at a second wavelength;
a first multiplexer adjacent to the first transmitter and the second transmitter, the first multiplexer configured to combine the first optical signal and the second optical signal into a first multi-wavelength optical signal with a first plurality of wavelengths;
a first mirror located adjacent to the first multiplexer such that the first mirror is in a path of the first multi-wavelength optical signal, the first mirror configured to reflect the first multi-wavelength optical signal based on a wavelength of each of the first plurality of wavelengths; and
an output fiber adjacent to the first transmitter and the second transmitter, the output fiber positioned such that the output fiber is in the path of the reflected first multi-wavelength optical signal.

11. The apparatus of claim 10, further comprising:
a second output fiber adjacent to the first transmitter and the second transmitter; and wherein the first mirror is selectively programmed to reflect the first multi-wavelength optical signal towards the second output fiber.

12. The apparatus of claim 10, further comprising:
a first optic element located between the first transmitter and the first mirror, the first optic element configured to focus the first optical signal at the first multiplexer; and
a second optic element located between the second transmitter and the first mirror, the second optic element configured to focus the second optical signal at the first multiplexer.

13. The apparatus of claim 12, wherein in the first optic element and the second optic element are lens.

14. The apparatus of claim 10, wherein the first wavelength and the second wavelength are different.

15. The apparatus of claim 10, wherein the first mirror is composed of liquid crystal on silicon.

16. The apparatus of claim 10, wherein the first mirror is moveable.

17. The apparatus of claim 10, wherein the first mirror is located vertically above the first transmitter and the second transmitter.

18. The apparatus of claim 10, wherein the first mirror is programmable.

19. An apparatus comprising:
a first receiver configured to receive a third optical signal at a third wavelength;
a second receiver configured to receive a fourth optical signal at a fourth wavelength;
a first de-multiplexer adjacent to the first receiver and the second receiver, the first de-multiplexer configured to de-multiplex a second multi-wavelength optical signal with a second plurality of wavelengths into the third optical signal and the fourth optical signal;
a second mirror located adjacent to the first de-multiplexer such that the second mirror is in a path of the second multi-wavelength optical signal, the second mirror configured to reflect the second multi-wavelength optical signal based on a wavelength of each of the second plurality of wavelengths; and
an input fiber adjacent to the first receiver and the second receiver, the input fiber positioned such that the input fiber is in the path of the reflected second multi-wavelength optical signal.

20. The apparatus of claim 19, wherein the second mirror is composed of liquid crystal on silicon.

* * * * *